(12) United States Patent
Karjalainen et al.

(10) Patent No.: US 10,476,654 B2
(45) Date of Patent: Nov. 12, 2019

(54) METHODS AND APPARATUS FOR OPERATING WIRELESS DEVICES

(71) Applicant: Avago Technologies International Sales Pte. Limited, Singapore (SG)

(72) Inventors: Juha Pekka Karjalainen, Oulu (FI); Karl Marko Juhani Lampinen, Oulu (FI); Samuli Turtinen, Ii (FI); Timo K. Koskela, Oulu (FI); Sami Jukka Hakola, Kempele (FI)

(73) Assignee: Avago Technologies International Sales Pte. Limited, Singapore (SG)

( * ) Notice: Subject to any disclaimer, the term of this patent is extended or adjusted under 35 U.S.C. 154(b) by 125 days.

(21) Appl. No.: 15/436,325

(22) Filed: Feb. 17, 2017

(65) Prior Publication Data

US 2017/0163403 A1 Jun. 8, 2017

Related U.S. Application Data

(62) Division of application No. 13/772,970, filed on Feb. 21, 2013, now Pat. No. 9,577,813.

(30) Foreign Application Priority Data

Feb. 23, 2012 (GB) .................. 1203143.1

(51) Int. Cl.
*H04L 5/14* (2006.01)
*H04L 5/00* (2006.01)
(Continued)

(52) U.S. Cl.
CPC .............. *H04L 5/14* (2013.01); *H04L 5/1438* (2013.01); *H04W 8/22* (2013.01); *H04W 64/003* (2013.01);
(Continued)

(58) Field of Classification Search
CPC combination set(s) only.
See application file for complete search history.

(56) References Cited

U.S. PATENT DOCUMENTS

| 5,828,658 A | 10/1998 | Ottersten et al. |
| 7,962,161 B1 | 6/2011 | Giallorenzi et al. |

(Continued)

FOREIGN PATENT DOCUMENTS

| EP | 1 920 626 | 5/2008 |
| EP | 2 016 748 | 1/2009 |

(Continued)

OTHER PUBLICATIONS

3GPP, "Feasibility study for Further Advancements for E-UTRA (LTE Advanced) (Release 10)", TR 36.912 V10.0.0(Mar. 2011) (62 pages).

(Continued)

*Primary Examiner* — Yee F Lam
(74) *Attorney, Agent, or Firm* — Foley & Lardner LLP (57) ABSTRACT

A system of operating a wireless device in a wireless communication network includes selecting, by the wireless device, a preferred operating mode for use by the wireless device, the selection being made from at least a full duplex operating mode in which the wireless device can transmit and receive simultaneously on the same frequency band and a non full duplex operating mode; and transmitting a signal indicating the selected preferred operating mode to a network entity.

14 Claims, 6 Drawing Sheets

(51) Int. Cl.
*H04W 8/22* (2009.01)
*H04W 64/00* (2009.01)
*H04W 72/12* (2009.01)

(52) U.S. Cl.
CPC ........... *H04W 72/12* (2013.01); *H04L 5/0023* (2013.01); *H04L 5/0032* (2013.01)

(56) References Cited

U.S. PATENT DOCUMENTS

| | | |
|---|---|---|
| 8,811,240 B2 | 8/2014 | Chindapol et al. |
| 2007/0041347 A1 | 2/2007 | Beale et al. |
| 2007/0099571 A1 | 5/2007 | Withers et al. |
| 2007/0217540 A1* | 9/2007 | Onggosanusi ....... H04B 7/0417 375/267 |
| 2007/0254692 A1 | 11/2007 | McCoy |
| 2008/0153431 A1 | 6/2008 | Haartsen et al. |
| 2009/0268645 A1* | 10/2009 | Chindapol ........... H04L 5/0007 370/281 |
| 2009/0296609 A1 | 12/2009 | Choi et al. |
| 2010/0142418 A1 | 6/2010 | Nishioka et al. |
| 2011/0013581 A1* | 1/2011 | Lee ....................... H04L 5/0007 370/329 |
| 2012/0113831 A1 | 5/2012 | Pelletier et al. |
| 2013/0089009 A1* | 4/2013 | Li ....................... H04L 27/2601 370/278 |
| 2013/0142136 A1 | 6/2013 | Pi et al. |
| 2013/0188510 A1* | 7/2013 | Siomina ................ H04W 24/10 370/252 |
| 2013/0308503 A1* | 11/2013 | Kim ..................... H04L 5/0053 370/280 |
| 2014/0022961 A1* | 1/2014 | Park .................... H04W 52/146 370/280 |
| 2015/0009927 A1 | 1/2015 | Larsson et al. |
| 2015/0312905 A1 | 10/2015 | Seo et al. |

FOREIGN PATENT DOCUMENTS

| | | |
|---|---|---|
| EP | 2 198 637 | 6/2010 |
| EP | 2 225 906 | 9/2010 |
| EP | 2 343 838 | 7/2011 |
| GB | 2 448 757 | 10/2008 |
| WO | WO-2006/014912 | 2/2006 |
| WO | WO-2007/020292 | 2/2007 |
| WO | WO-2007/127532 | 11/2007 |
| WO | WO-2009/047709 | 4/2009 |
| WO | WO-2009/063001 | 5/2009 |
| WO | WO-2010/076604 | 7/2010 |
| WO | WO-2013/012913 | 1/2013 |

OTHER PUBLICATIONS

3GPP, "Physical layer procedures (FDD) (Release 10)" TS 25.214 V10.4.0(Sep. 2011) (100 pages).
3GPP, "Physical layer procedures (Release 10)" TS 36.213 V10.3. 0(Sep. 2011)(122 pages).
3GPP, "Radio Resource Control (RRC); Protocol specification (Release 10)" TS 36.331 V10.3.0(Sep. 2011)(296 pages).
3GPP, "User Equipment (UE) radio transmission and reception (Release 10)" TS 36.101 V10.4.0(Sep. 2011)(450 pages).
3GPP, Physical Channels and Modulation (Release 10) TS 36.211 V10.3.0(Sep. 2011)(103 pages).
Achaleshwar Sahai, Gaurav Patel and Ashutosh Sabharwal, "Pushing the limits of Full-duplex: Design and Real-time Implementation", Rice university technical report TREE1104, Jul. 4, 2011 (12 pages).
Ericsson, ST-Ericsson, "On support of different TDD UL-DL configurations on different bands", R1-113674, 3GPP TSG-RAN WG1 #67 San Francisco, Nov. 14-18, (6 pages).
Evan Everett, Melissa Duarte, Chirs Dick, and Ashutosh Sabharwal, "Empowering Full-Duplex Wireless Communication by Exploiting Directional Diversity", accepted to the 45th annual Asilomar conference on signals, systems, and computers 2010, pp. 2002-2006 (5 pages).
Huawei, HiSilicon, "Cross-carrier scheduling design for TDD interband CA with different UL-DL configurations", R1-113634, 3GPP TSG RAN WG1 Meeting #67 San Francisco, USA, Nov. 14-18, 2011 (5 pages).
Jung Il Choi, Mayank Jainy, Kannan Srinivasany, Philip Livis, Sachin Katti, "Achieving Single Channel, Full Duplex Wireless Communication", In the Proceedings of the 16th Annual International Conference on Mobile Computing and Networking, Mobicom 2010, Sep. 20-24, 2010, Chicago, Illinois, USA (12 pages).
Melissa Duarte and Ashutosh Sabharwal, "Full-Duplex Wireless Communications Using Off-The-Shelf Radios: Feasibility and First Results", in the proceedings of the 44th annual Asilomar conference on signals, systems, and computers 2010, Nov. 7-10, 2010 (5 pages).
Melissa Duarte, Chris Dick and Shutosh Sabharwal, "Experiment-driven Characterization of Full-Duplex Wireless Systems", Submitted to IEEE Transactions on Wireless Communications, Jul. 2011 (31 pages).
Morgensen, P.; Wei Na; Kovacs, I.Z.; Frederiksen, F.; Pokhariyal, A.; Pedersen, K.I.; Kolding, T.; Hugl, K.; Kuusela, M.; "LYE Capacity Compared to the Shannon Buond", Vehicular Technology Conference, 2007, VTC2007-Spring, IEEE 65th pp. 1234-1238 (5 pages).
New Postcom, "Discussion on TDD inter-band CA with different UL-DL configuration, "RI-113685, 3GPP TSG RAN WG1 #67 San Francisco, USA, Nov. 14-18, 2011 (6 pages).
Riihonen, T.; Werner, S.; Wichman, R.; "mitigation of Loopback Self-Interference in Full-Duplex MIMO Relays," Signal Processing, IEEE Transactions on wireless communications, vol. 59, No. 12, pp. 5983-5993, Dec. 2011 (11 pages).
UKIPO Search Report under Section 17 compiled Jul. 2, 2013 which is issued in a related British Application No. GB1203143.I (1 page).
UKIPO Search Report under Section 17 complied Jun. 14, 2012 which is issued in a related British Application No. GB1203143.1 (1 page).

* cited by examiner

METHODS AND APPARATUS FOR OPERATING WIRELESS DEVICES

CROSS REFERENCE TO RELATED APPLICATIONS

This application claims priority to and the benefit as a divisional of U.S. patent application Ser. No. 13/772,970, entitled "Methods and Apparatus for Operating Wireless Devices," filed Feb. 21, 2013; which claims the benefit under 35 U.S.C. § 119(a) and 37 CFR § 1.55 to UK Patent Application No. 1203143.1 filed on Feb. 23, 2012, the entire content of each of which are incorporated herein by reference.

TECHNICAL FIELD

The present invention relates to methods and apparatus for operating wireless devices in a wireless communication system.

BACKGROUND

Current wireless communication systems are typically either Frequency-Division Duplex (FDD) systems or Time-Division Duplex (TDD) systems. In FDD operation there are two carrier frequencies, one for uplink transmissions (user terminal to base station) and one for downlink transmissions (base station to user terminal). Hence, in FDD systems, uplink and downlink transmissions occur simultaneously but in different frequency bands. In TDD operation there is a single carrier frequency only and the uplink and downlink transmissions are separated in the time domain (e.g. occur in different system time slots). Hence, in TDD systems, uplink and downlink transmissions occur in the same frequency band but not simultaneously.

The respective standards that define cellular wideband code division multiple access (WCDMA) systems (so called 3G systems) and cellular long term evolution (LTE) systems (so called 4G systems) specify system variants based on both FDD and TDD. Wireless local area networks (WLAN), for example WiMAX, tend to be TDD systems only.

Herein, communication systems in which it is not possible to transmit and receive simultaneously in the same frequency band will be referred to as half-duplex or non full-duplex systems. In contrast, communication systems in which it is possible to transmit and receive simultaneously in the same frequency band (e.g. with no frequency duplex spacing between the transmission and reception bands) will be referred to as full-duplex systems. A frequency band refers to a frequency allocation assigned to a baseband signal after being up-converted on a certain carrier frequency.

Full-duplex communication has been recognized as a candidate technique for improving spectral efficiency in local area communications. In full-duplex communication systems techniques must be applied to reduce strong 'self-interference' that would otherwise occur as a result of the large power imbalance between the simultaneously transmitted signal and received signal. Typically, the transmitted signal can have a signal strength that is a few orders of magnitude larger than that of the intended received signal strength with the result that the intended received signal can be severely degraded by the transmitted signal.

Known techniques for reducing self interference at a full duplex transceiver can be broadly categorised as techniques that rely on the linear processing of antenna arrays at the transceiver to create a transmission null at the transceiver's receiver (referred to herein as linear space domain interference processing techniques) as discussed for example in references [1] or techniques that don't rely on the linear processing of antenna arrays at the transceiver but various other techniques (referred to herein as non-linear interference processing) such as those disclosed in references [2] to [6] listed below:

[1] Riihonen, T.; Werner, S.; Wichman, R.; "Mitigation of Loopback Self-Interference in Full-Duplex MIMO Relays," Signal Processing, IEEE Transactions on wireless communications, vol. 59, no. 12, pp. 5983-5993. December 2011.

[2] Jung II Choiy, Mayank Jainy, Kannan Srinivasany, Philip Levis, Sachin Katti, "Achieving Single Channel, Full Duplex Wireless Communication", In the Proceedings of the 16th Annual International Conference on Mobile Computing and Networking (Mobicom 2010).

[3] Melissa Duarte and Ashutosh Sabharwal, "Full-Duplex Wireless Communications Using Off-The-Shelf Radios; Feasibility and First Results", in the proceedings of the $44^{th}$ annual Asilomar conference on signals, systems, and computers 2010.

[4] Melissa Duarte, Chris Dick and Ashutosh Sabharwal, "Experiment-driven Characterization of Full-Duplex Wireless Systems", Submitted to IEEE Transactions on Wireless Communications, July 2011.

[5] Evan Everett, Melissa Duarte, Chris Dick, and Ashutosh Sabharwal, "Empowering Full-Duplex Wireless Communication by Exploiting Directional Diversity", accepted to the $45^{th}$ annual Asilomar conference on signals, systems, and computers 2010.

[6] Achaleshwar Sahai, Gaurav Patel and Ashutosh Sabharwal, "Pushing the limits of Full-duplex: Design and Real-time Implementation", Rice university technical report TREE1104.

LTE and WiMAX communication systems, amongst others, employ Multiple Input Multiple Output (MIMO) techniques to enhance data rates (throughput) and spectral efficiency. As is well known, MIMO refers to the use of multiple antennas at the receiver and multiple antennas at the transmitter. Different modes of MIMO are known, including spatial multiplexing, transmit diversity, and beam forming.

Spatial multiplexing allows the transmission of different independent layers or streams of data simultaneously on the same downlink (or, as the case may be, uplink) resources to increase data rates for a given channel bandwidth. Transmit diversity schemes increase the resilience of a propagation channel, rather than increasing data rates, and are often used when channel conditions do not permit spatial multiplexing. Beam forming techniques provide for the shaping of the overall antenna beam in the direction of the target receiver and again are often used when channel conditions do not permit spatial multiplexing.

In a MIMO system, each receive antenna may receive the signal transmitted from each transmit antenna and the channel between the transmitter and the receiver can be described by a channel matrix H including the matrix elements $h_{ij}$, where $h_{ij}$ is the channel gain from transmit antenna j to receive antenna i. If spatial multiplexing is employed, the number of independent data layers or streams that can usefully be transmitted in parallel over a MIMO channel is at most the minimum of the number of receive antennas and the number of transmit antennas, and is further limited by the rank (i.e. the minimum number of linearly independent rows and columns) of the channel matrix H. In certain known communications systems, for example, LTE systems, spatial multiplexing relies upon a user device (i.e. a mobile user equipment) providing periodic feedback to the base station (i.e. Node B) serving it. The feedback includes a so called Rank Indication (RI) determined by the user device, based on channel and interference conditions, which indicates a suggested number of layers for transmission on the downlink to the user device. The base station may or may not follow the suggestion provided by the user device.

In environments where the transmission antennas are not sufficiently de-correlated, for example in a low scattering environment (i.e. where there are few or no objects to reflect signals from the different antennas to the different receive antennas along different paths), the rank of the channel matrix H is low and the potential throughput advantages of spatial multiplexing cannot be utilized effectively. Typically, an environment is not sufficiently scattering enough to warrant the use of spatial multiplexing if a Line of Sight (LOS) exists between the transmitter and the receiver in a MIMO system which can result in the rank of the channel matrix reducing to 1. In known systems it is possible to switch between MIMO modes in response to changing channel conditions, and typically, for rank 1 channels, transmit diversity or beam forming is used instead of spatial multiplexing. It is well-known that for rank one channels the maximum throughput of a half duplex system is limited by the performance of the rank one transmit diversity or beam forming pre-coding performed at the transmitter, power allocation to the channel and the modulation and coding scheme (MCS) selected for the channel.

Wireless systems have been proposed in which it is possible to selectively use a full duplex operation mode instead of a half duplex mode, under certain channel conditions, in order to improve throughput. It is desirable to provide a system in which the signalling schemes used to configure devices in a full duplex operation mode or a half duplex operating mode and/or schedule the devices are straightforward.

SUMMARY

In a first exemplary embodiment of the invention, there is an apparatus for a wireless device operating in a wireless communication network, the apparatus including: at least one processor; and at least one memory including computer program code, the at least one memory and the computer program code being configured to, with the at least one processor, to cause the apparatus to: select a preferred operating mode for use by the wireless device, the selection being made from at least a full duplex operating mode in which the wireless device can transmit and receive simultaneously on the same frequency band and a non full duplex operating mode; and determine to transmit a signal indicating the selected preferred operating mode to a network entity.

In a second exemplary embodiment of the invention there is an apparatus for a network entity operating in a wireless communications network, the apparatus including: at least one processor; and at least one memory including computer program code, the at least one memory and the computer program code being configured to with the at least one processor, to cause the apparatus to, receive from each of one or more wireless devices operating in the network an indication of a preferred operating mode for use by the wireless device and selected by that wireless device from at least a fill duplex operating mode in which the wireless device can transmit and receive simultaneously on the same frequency band and a non full duplex operating mode; and determine for each of the one or more wireless devices whether or not to support its indicated preferred operating mode.

In a third exemplary embodiment of the invention there is a method of operating a wireless device in a wireless communication network, the method including: selecting, by the wireless device, a preferred operating mode for use by the wireless device, the selection being made from at least a full duplex operating mode in which the wireless device can transmit and receive simultaneously on the same frequency band and a non full duplex operating mode; and determining to transmit a signal indicating the selected preferred operating mode to a network entity.

In a fourth exemplary embodiment of the invention there is a method of operating a network entity in a wireless communications network, the method including: receiving from each of one or more wireless devices operating in the network an indication of a preferred operating mode for use by the wireless device and selected by that wireless device from at least a full duplex operating mode in which the wireless device can transmit and receive simultaneously on the same frequency band and a non full duplex operating mode; and determining for each of the one or more wireless devices whether or not to support its indicated preferred operating mode.

In a fifth exemplary embodiment of the invention there is a non-transitory computer-readable storage medium including a set of computer-readable instructions stored thereon, which, when executed by a processing system, cause the processing system to carry out the method of the third exemplary embodiment of the invention.

In a sixth exemplary embodiment of the invention there is a non-transitory computer-readable storage medium including a set of computer-readable instructions stored thereon, which, when executed by a processing system, cause the processing system to carry out the method of the fourth exemplary embodiment of the invention.

In a seventh exemplary embodiment of the invention there is a network apparatus in a wireless communication system, the apparatus including, at least one processor; and at least one memory including computer program code, the at least one memory and the computer program code being configured to, with the at least one processor, to cause the apparatus to, determine to send, at least one first user equipment served by a base station, a message indicating that the at least one first user equipment is to operate in a half duplex mode, in which mode some time periods are reserved for the first user equipment to transmit in a frequency band without receiving in the frequency band and other time periods are reserved for the first user equipment to receive in the frequency band without transmitting in the frequency band; determine to send, at least one second user equipment, served concurrently by the base station with the at least one first user equipment, a message indicating that the at least one second user equipment is to operate in a full duplex mode in which mode the at least one second user equipment can simultaneously transmit and receive in the frequency band; and schedule transmissions to and from the at least one first user equipment and to and from the at least one second user equipment.

Further features and advantages of the invention will become apparent from the following description of preferred embodiments of the invention, given by way of example only, which is made with reference to the accompanying drawings.

DETAILED DESCRIPTION

Exemplary embodiments are concerned with methods and apparatus for operating wireless devices in a wireless communications network. Certain embodiments are particularly suitable for use in mobile wireless networks such as a Universal Terrestrial Radio Network (UTRAN), a Long Term Evolution (LTE) network, LTE-A network and in Wireless LAN (WLAN) networks.

Figure 1:
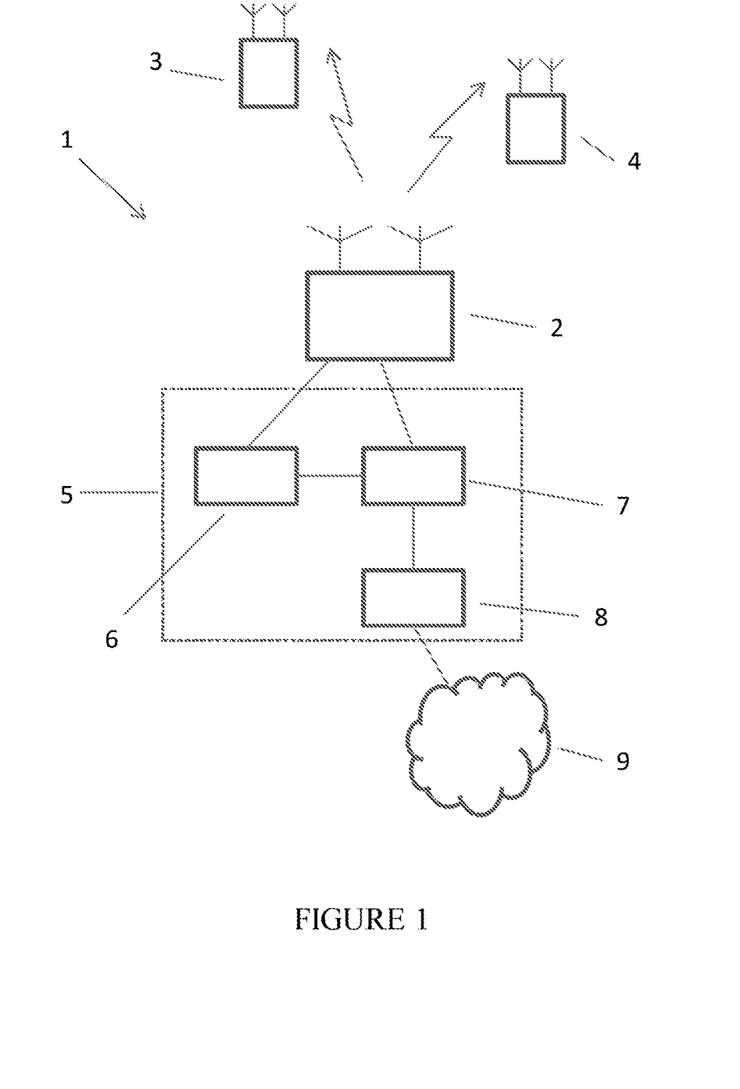
FIG. 1 is a schematic illustration of a communications network.

FIG. 1 schematically illustrates a communication network 1 including a base station or access point 2 for communicating over a radio air interface with one or more mobile user devices 3 and 4 present in a geographical area served by the base station 2. It will be understood that the wireless communication network 1 may include a plurality of such base stations 2, each serving a different one of a plurality of contiguous geographical areas, although for simplicity only a single base station 2 is shown. The communications network 1 further includes a core network 5 for exchanging control signalling and user data with the base station 2. In one example, if the network 1 is based on a LTE network, the core network may include a mobile management entity 6 and a serving gateway 7 for exchanging control plane signalling and user plane data respectively with the base station 2, with the serving gateway 7 connected to a packet data gateway 8 for connectivity to external networks 9, such as the Internet.

In the communication network 1 transmissions from the base station 2 to a user device 3, 4 are on the downlink (sometimes referred to as the forward link) and transmissions from a user device 3, 4 to the base station 2 are on the uplink (sometimes referred to as the reverse link). In the preferred example of an LTE system, the downlink transmission scheme is based on Orthogonal Frequency Division Multiplexing (OFDM) and the uplink transmission scheme is based on Single Carrier Frequency Division Multiplexing (SC-FDMA). In both schemes data is allocated to individual user devices 3, 4 in terms of resource blocks (RBs) (a resource block includes 12 consecutive sub-carriers in the frequency domain and one 0.5 ms slot in the time domain). On the downlink, user data for a user device 3, 4 is carried on the Physical Downlink Shared Channel (PDSCH) and on the uplink, user data from a user device is carried on the Physical Uplink Shared Channel (PUSCH). Communications between the base station 2 and a user device 3, 4 can be selectively conducted on either a full duplex basis or a non full duplex basis. If the communications are conducted on a full duplex basis, transmissions on the downlink and the uplink can occur simultaneously in the same frequency band (e.g. at the same carrier frequencies). If the communications are conducted on a non full duplex basis, transmissions on the downlink and the uplink are separated in the time domain (i.e. they occur in different time slots) or in the frequency domain (e.g. they occur in different non overlapping bands at different carrier frequencies).

In the preferred example, based around a modified LTE Time Division Duplex (TDD) system, for a user device operating in a cell in conventional non full duplex operation (i.e. half duplex operation), as is normal, for that user device, some sub-frames in each radio frame are allocatable by the network exclusively for uplink transmissions and other sub-frames in each radio frame are allocatable exclusively for downlink transmissions, whereas for a user device operating in the cell in the new full duplex operation, for that user device, at least some sub-frames in each radio frame are allocatable by the network for simultaneous uplink and downlink transmissions.

To this end, the base station 2 and the user device 3, 4 are each provided with means for implementing full duplex wireless communications. Such means may implement any of the non-linear cancellation techniques disclosed in references [2 to 6] mentioned above, techniques based upon the linear processing of antenna arrays as discussed in reference [1] mentioned above, or indeed any suitable technique for achieving full duplex wireless communications.

Furthermore, the base station 2 and the user devices 3, 4 may be each be provided with multiple antenna arrays and associated signal processing means for implementing Multiple Input Multiple Output (MIMO) communications between the base station 2 and a user device 3, 4, on the downlink or on the uplink, either conventionally in conjunction with non full duplex operation, or in conjunction with full duplex operation. Different MIMO modes may be selectively employed, including spatial multiplexing, transmit diversity, and beam forming.

Figure 2:
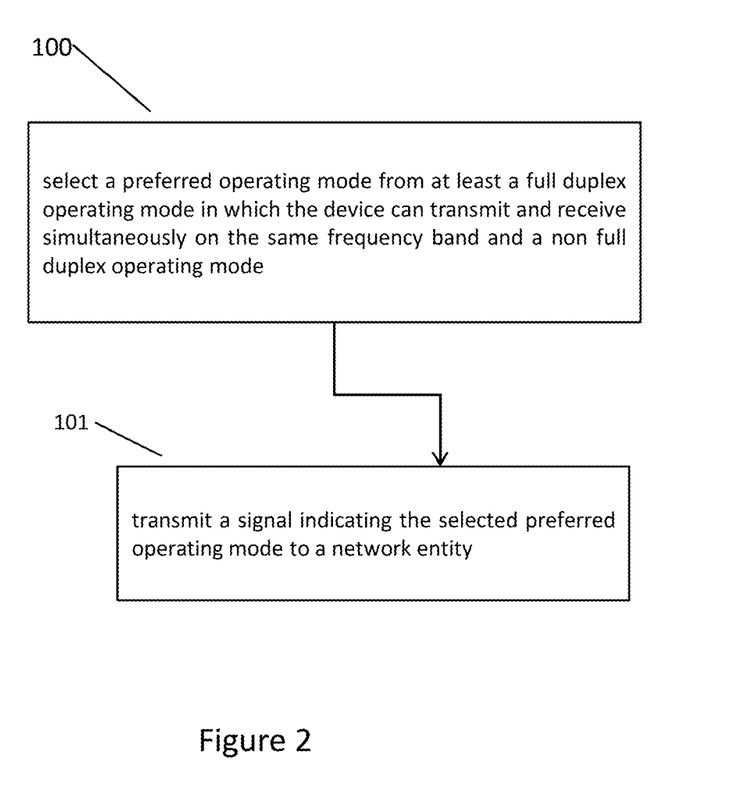
FIG. 2 illustrates steps that may be performed in a user device in the communications network.

Accordingly, as is illustrated in FIG. 2, in exemplary embodiments of the invention, at periodic intervals, in step 100, each user device 3, 4 that is capable of full duplex wireless communications selects a preferred operating mode from at least a full duplex operating mode in which the device can transmit and receive simultaneously on the same frequency hand and a non full duplex operating mode. In step 101, each user device transmits a signal indicating the selected preferred operating mode to a network entity, for example base station 2. Each user device 3, 4 may also select a preferred transmission rank indicating a preferred number of data layers or streams for transmission to the wireless device from another device, for example the base station 2, and transmit a signal indicating the selected preferred transmission rank to the network entity. The selection of the preferred operating mode and/or the preferred transmission rank may at least partly be made using measurements of signals received from the another device.

The selected preferred transmission rank and preferred operating mode may be indicated together in the same signal. For example, the signal may include a field including a first number of one or more bits that indicate the selected preferred transmission rank and a second number of one or bits that indicate the selected preferred operating mode.

This information, together with other information, is then used by the base station 2 when determining what transmission rank to schedule for that user device 3, 4 and whether to schedule full duplex operation or non full duplex operation for that user device 3, 4. The base station 2 may or may not follow the suggestions supplied by the user device 3, 4.

Figure 3:
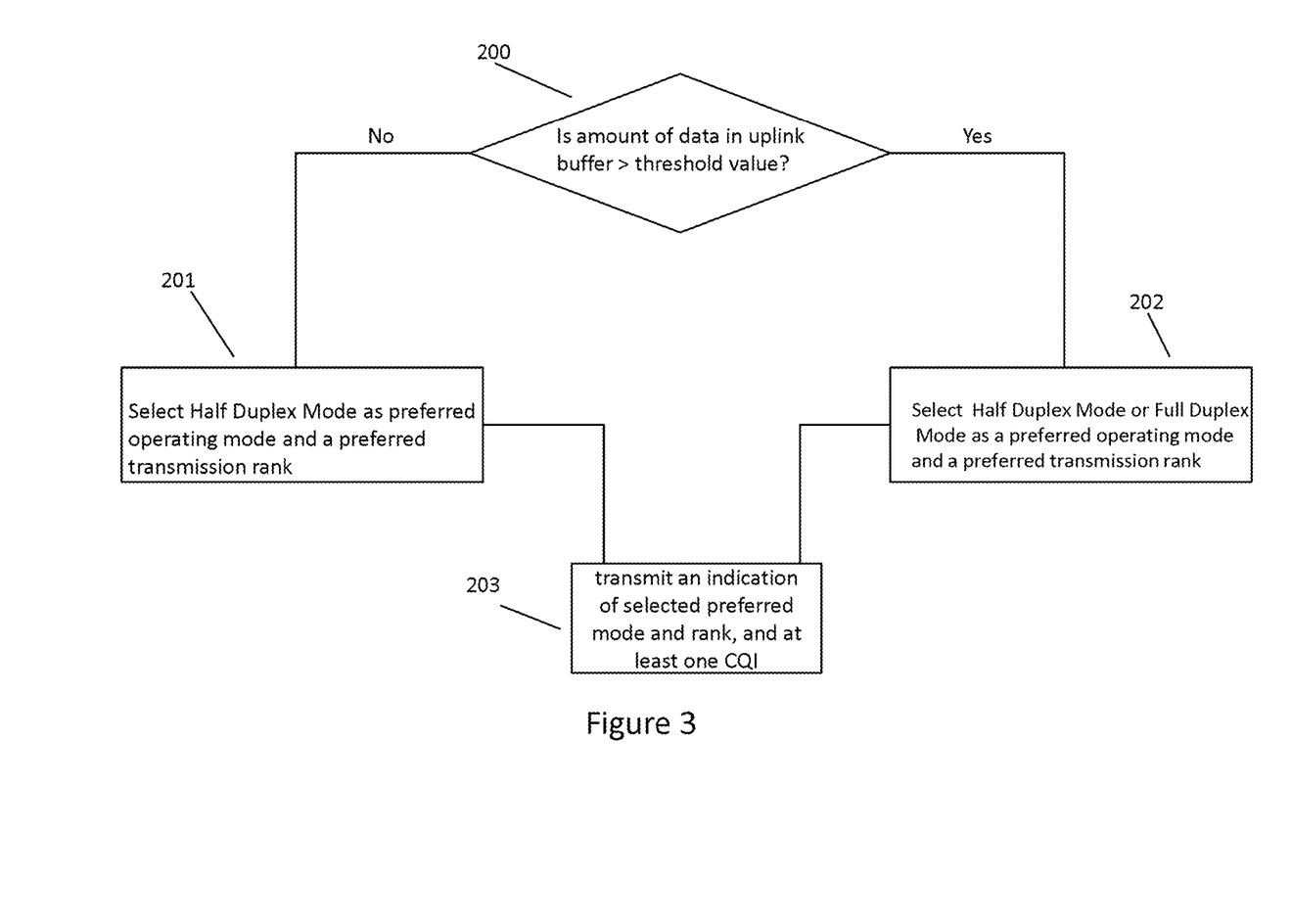
FIG. 3 illustrates steps that may be performed in a user device in the communications network.

Referring now to FIG. 3, in a preferred example based on a modified LTE TD system, each full duplex enabled user device 3, 4 determines at step 200 whether the amount of data in its uplink buffer (i.e. the amount of data currently awaiting to be transmitted on the uplink) is greater than a pre-determined buffer threshold value or not. If no, there is not enough data in the uplink buffer for the user device 3, 4 to require full duplex operation and so the user device 3, 4 disregards the option of selecting full duplex operation as the preferred operating mode and instead selects, step 201, half duplex operation as the preferred operating mode and a transmission rank that is estimated to maximise downlink throughput as the preferred transmission rank.

If yes, step 202, the user device 3, 4 selects as its preferred combination of operating mode (i.e. full duplex or half duplex) and downlink transmission rank as the combination estimated to maximise downlink throughput. At step 203, the user device 3, 4 transmits an indication of the selected preferred transmission rank, the selected preferred operation mode and one or more Channel Quality Indicators (CQI) to the base station 2. The CQI indicates a modulation scheme and coding rate in an LTE system and a modulation scheme and transport block size in a WCDMA system.

Figure 4:
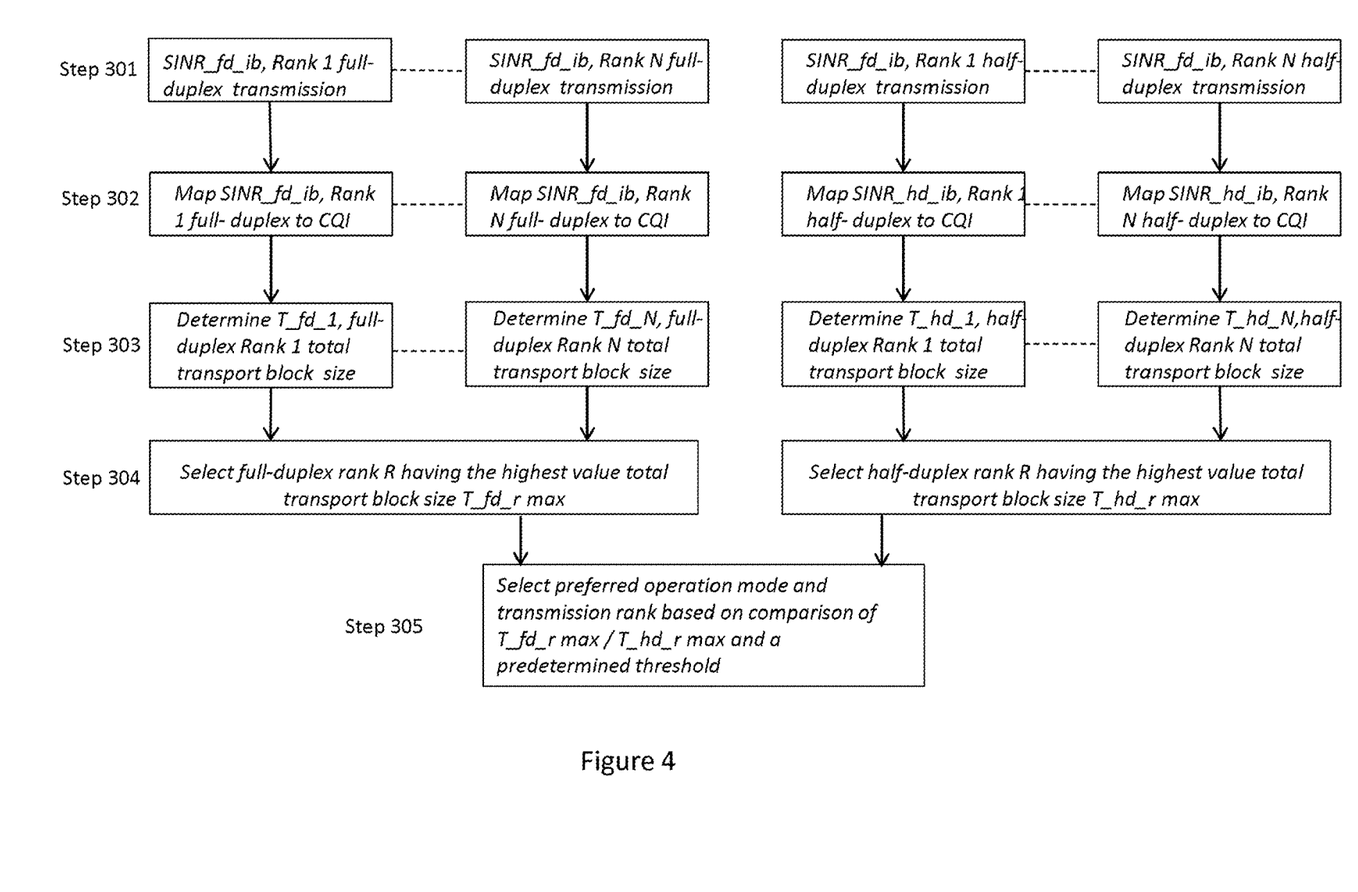
FIG. 4 illustrates steps that may be performed in a user device in the communications network.

FIG. 4, illustrates individual steps that are performed in step 202 of FIG. 2. The combination of transmission rank and operation mode estimated to providing the maximum throughput may be determined based on measurements of the downlink Signal to Interference Plus Noise Ratio (SINR), at the relevant user device 3, 4, for each available downlink transmission rank for full duplex operation and for half duplex operation.

Accordingly, at step 301, for each downlink transmission rank available for full duplex operation, the user device 3, 4 determines the downlink SINR_fd_ib for each i,th MIMO stream and b,th resource block associated with that rank in accordance Equation 1 below, and for each downlink transmission rank available for half duplex operation, the user device 3, 4 determines the downlink SINR_hd_ib for each i:th MIMO stream and b,th resource block associated with that rank in accordance Equation 2 below:

$$SINR\_fd\_ib = S\_ib/(I\_ib + IULDL\_ib) \quad \text{(Equation 1)}$$

$$SINR\_hd\_ib = S\_ib/I\_ib \quad \text{(Equation 2)}$$

Where S_ib is the desired signal power in the downlink for MIMO stream i and resource block b after receiver processing at the user device;
  I_ib is sum of cell interference (both inter and intra) and thermal noise power at the user for MIMO stream i and resource block b; and
  IULDL_ib is the interference power at the user device's receiver, for MIMO stream i and resource block b, caused by the user device's transmitter.

It will be appreciated that for rank 1 transmissions there is just a single stream, for rank 2 transmissions two spatially multiplexed streams, for rank 3 transmissions three spatially multiplexed streams and so on.

The user device 3, 4 may obtain measurements of both S_ib and I_ib in conventional fashion from the Cell Specific Reference Signal (CRS) transmitted on the downlink in LTE systems and used for channel estimation, or alternatively, in conventional fashion from the Channel State Information RS (CSI-RS) signal transmitted on the downlink in LTE-Advanced systems. The user device 3, 4 may obtain measurements of IULDL_ib from the Sounding Reference Signal (SRS) transmitted on the uplink in LTE systems and used to measure uplink channel quality. To this end, the user device 3, 4 receives at its own receiver the SRS transmitted on the uplink from its own transmitter, and measures the IULDL_ib from this received SRS. In instances of full duplex operation where the degree of cancellation of the interference of the uplink on the downlink is high the IULDL_ib will be correspondingly low and where the degree of cancellation of the interference of the uplink on the downlink is low the IULDL_ib will be correspondingly high.

Table 1 below illustrates for transmission ranks 1 to N (column 1), the corresponding sets of SINR measurements obtained for fill duplex operation (column 2) and the sets of SINR measurements obtained for half duplex operation (column 3). Naturally, each set includes a number of measurements that depends upon the rank (i.e. number of streams) for that set and the number of resource blocks for each stream, although for simplicity, the number of measurements in each set is illustrated on a per stream basis only (i.e. one measurement per stream)

TABLE 1

| Rank | Full Duplex SINR Measurements | Half Duplex SINR Measurements |
|---|---|---|
| 1 (one stream) | $SINR\_fd\_1_1$ | $SINR\_hd\_1_1$ |
| 2 (2 spatially multiplexed streams) | $SINR\_fd\_2_1$ $SINR\_fd\_2_2$ | $SINR\_hd\_2_1$ $SINR\_hd\_2_2$ |
| ⋮ | ⋮ | ⋮ |
| N (N spatially multiplexed streams) | $SINR\_fd\_N_1$ $SINR\_fd\_N_2$ ⋮ $SINR\_fd\_N_N$ | $SINR\_hd\_N_1$ $SINR\_hd\_N_2$ ⋮ $SINR\_hd\_N_N$ |

At step 302, for each set of SINR measurements, the user terminal 3, 4 maps the SINR measurements to either one or two CQI index values. Table 2 below illustrates the results of this mapping for the full duplex.

SINR measurements and Table 3 below for the half duplex SINR measurements

TABLE 2

| Rank | Full Duplex SINR Measurements | CQI |
|---|---|---|
| 1 (one stream) | $SINR\_fd\_1_1$ | $CQI\_fd\_1_{codeword1}$ |
| 2 (2 spatially multiplexed streams) | $SINR\_fd\_2_1$ $SINR\_fd\_2_2$ | $CQI\_fd\_2_{codeword1}$ $CQI\_fd\_2_{codeword2}$ |
| ⋮ | ⋮ | ⋮ |
| N (N spatially multiplexed streams) | $SINR\_fd\_N_1$ $SINR\_fd\_N_2$ ⋮ $SINR\_fd\_N_N$ | $CQI\_fd\_N_{codeword1}$ $CQI\_fd\_N_{codeword2}$ |

TABLE 3

| Rank | Half Duplex SINR Measurements | CQI |
|---|---|---|
| 1 (one stream) | $SINR\_hd\_1_1$ | $CQI\_hd\_1_{codeword1}$ |
| 2 (2 spatially multiplexed streams) | $SINR\_hd\_2_1$ $SINR\_hd\_2_2$ | $CQI\_hd\_2_{codeword1}$ $CQI\_hd\_2_{codeword2}$ |
| ⋮ | ⋮ | ⋮ |
| N (N spatially multiplexed streams) | $SINR\_hd\_N_1$ $SINR\_hd\_N_2$ ⋮ | $CQI\_hd\_N_{codeword1}$ $CQI\_hd\_N_{codeword2}$ |

TABLE 3-continued

| Rank | Half Duplex SINR Measurements | CQI |
|---|---|---|
| | ⋮ | |
| | SINR_hd_$N_N$ | |

In the example of an LTE system, for rank 1, assuming so called 'wideband CQI reporting' (a CQI result based on the complete system bandwidth) the mapping generates one CQI index value because (as there is no spatial multiplexing with rank 1), the base station 2 would generate at most a single codeword (as is well known a code word is a transport block which has been processed by the physical layer in terms of CRC addition, channel coding and rate matching) within a transmission time interval (TTI) for a user device 3, 4 and so one CQI index value is required for that codeword. For ranks 2 and higher, again assuming so called 'wideband CQI reporting', the mapping generates two CQI index values because, in the case of spatial multiplexing, the base station 2 would generate two code words within a TTI for a user device 3, 4 and so a CQI per codeword is required. Alternatively, a user device may make use of so called 'sub-band CQI' reporting where a series of CQI results is generated where each result is based upon an assumption that a codeword would span a configured sub-band.

The current LTE specification defines 16 possible CQI index values, each indicating a different combination of modulation scheme and coding rate. The CQI Table is reproduced below as Table 4.

TABLE 4

| CQI index | Modulation | Code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In this example, in line with current LTE requirements, the mapping results in each CQI index value being the highest value taken from Table 4 that would satisfy the condition that PDSCH transmissions were received with a codeword error rate of no more than 10%.

In the preferred example of a modified LTE system, as a CQI report is configured to a certain bandwidth (e.g. wide band CQI or sub band CQI over B resource blocks), the SINR to CQI mapping described above, can be understood as a two step process including the steps of: (a) calculating an average spectral efficiency over the defined set of resource blocks and over the streams associated with a codeword and then (b) mapping the spectral efficiency to a CQI index value by (i) comparing the computed spectral efficiency with each of the spectral efficiencies given in Table 4 to determine a difference vector for each CQI index and (ii) selecting the CQI index which has the smallest value difference vector.

One suitable technique for mapping between the measured SINR values and spectral efficiency is described in Mogensen, P.; Wei Na; Kovacs, I. Z.; Frederiksen, F.; Pokhariyal, A.; Pedersen, K. I.; Kolding, T.; Hugl. K.; Kuusela, M.; "LTE Capacity Compared to the Shannon Bound", Vehicular Technology Conference, 2007. VTC2007-Spring. IEEE 65th, Page(s): 1234-1238, which teaches that an estimate of the spectral efficiency in ([bits/s/Hz]) for the x-th, x=1, 2, codeword can be computed as $$\frac{1}{|N_x|} \theta \cdot \epsilon \sum_{i \in N_x} \sum_{b \in B_i} \log_2\left(1 + \frac{\gamma_{i,b}}{\beta}\right)$$

where, i is the index for transmitted streams; the operator ∥ indicates the cardinality of a set; $N_x$ is the set of streams belonging to the x-th codeword with size $|N_x|$; $B_i$ is the set of resource blocks belonging to the i-th stream with the size of $|B_i|$ (the cardinality of $|B_i|$ is defined by the number of resource blocks associated with the CQI computation), $\epsilon$ defines bandwidth efficiency (this depends on system parameters, such as the length of the cyclic prefix (CP),), $\gamma\_(i, b)$ is the SINR for the i-th stream and b-th resource block, $\theta$ is a correction factor which is nominally set to one; and $\beta$ is an implementation dependent constant, dependent for example upon, receiver type.

At step 303, for each available rank for Full Duplex operation, the user device 3, 4 generates, based on that rank's CQI index value or values and a configuration of the bandwidth (i.e. the number or resource blocks) that the base station has configured for this CQI report, an estimated total transport block size, T_fd_r, for full duplex operation at that rank assuming transmissions using the modulation and coding scheme (or two schemes for ranks >1) indicated by the CQI index value or values. It will be appreciated that for rank 1, the estimated total transport block size is an estimate of the size of the single transport block that can be transmitted, whereas for ranks greater than 1, the estimated total transport block size is the sum of the estimated sizes of the two transport blocks that can be transmitted. Also at step 303, the user device 3, 4 repeats this process for each available rank for half Duplex operation to generate an estimated total transport block size, T_hd_r, for half duplex operation.

Tables 5 and 6 below illustrate the full duplex T_fd_r and half duplex T_hd_r respectively.

TABLE 5

| Rank | Full Duplex CQI | Full Duplex Total Transport Block Size (T_fd_r) |
|---|---|---|
| 1 (one stream) | CQI_fd_1$_{codeword1}$ | T_fd_1 |
| 2 (2 spatially multiplexed streams) | CQI_fd_2$_{codeword1}$ CQI_fd_2$_{codeword2}$ | T_fd_2 |
| ⋮ | ⋮ | ⋮ |
| N (N spatially multiplexed streams) | CQI_fd_N$_{codeword1}$ CQI_fd_N$_{codeword2}$ | T_fd_N |

TABLE 6

| Rank | Half Duplex CQI | Half Duplex Total Transport Block Size ($T\_hd\_r$) |
|---|---|---|
| 1 (one stream) | $CQI\_hd\_1_{codeword1}$ | $T\_hd\_1$ |
| 2 (2 spatially multiplexed streams) | $CQI\_hd\_2_{codeword1}$ $CQI\_hd\_2_{codeword2}$ | $T\_hd\_2$ |
| • | • | • |
| • | • | • |
| • | • | • |
| N (N spatially multiplexed streams) | $CQI\_hd\_N_{codeword1}$ $CQI\_hd\_N_{codeword2}$ | $T\_hd\_N$ |

At step 304, the user device 3, 4 selects the full duplex rank having the highest value T_fd_r max from the T_fd_r values and the half duplex rank having the highest value T_hd_r max from the T_hd_r values.

At step 305, to select a final preferred operation mode and downlink transmission rank, the user device 3, 4 takes the ratio of T_fd_r max and T_hd_r max and compares the ratio to a predetermined threshold value. If the ratio is less than the threshold value, the half duplex operation mode is selected and the rank of T_hd_r max are selected, but if the ratio is greater than the threshold value full duplex operation and the rank of T_fd_r max are selected. It is anticipated that T_fd_r max will always be smaller than T_hd_r max because the SINR at the receiver for full duplex operation will always be smaller than the SINR at the receiver for half duplex operation. Despite, T_fd_r being smaller than T_hd_r, often the downlink throughput achievable with full duplex operation will be greater than that achievable with half duplex operation because, in any given frame, in half duplex operation a limited number of slots are allocated to the downlink whereas in full duplex operation, in theory, all slots may be allocated for downlink (although in practice this may not be achievable). Accordingly, the threshold value is set so as to balance the larger transport block sizes expected for half duplex transmission against the greater number of slots expected to be available for full duplex downlink transmission to determine which mode will provide the likely greater downlink throughput. The threshold is therefore set at a value for which half duplex is expected to provide the greater throughput if the ratio is less than it and full duplex is expected to provide the greater throughput if the ratio is greater than it.

In an alternative embodiment, at step 305, the sum of T_fd_r max and the previous scheduled uplink transport block size is compared with T_hd_r max. If the sum exceeds the T_hd_r max the fill duplex mode is selected and if not the half duplex mode is selected.

Step 201 of FIG. 3 may be performed in a corresponding manner to that of step 202, but the process involving only the available combinations of half duplex mode and transmission rank and excluding any consideration of the available combinations of full duplex mode and transmission rank.

In operation, a user device 3, 4 sends reports indicating its current preferred RI, preferred operation mode (i.e. half duplex or full duplex) and CQI index value or values on the uplink to the base station 2. The rate at which reports are sent may be periodic, for example at a rate set in a RRC Connection Reconfiguration message or aperiodic, for example, in response to requests from the base station 2. For example, in current LTE system according to 3GPP TS36.213 v.10.4.0 section 7.2.2: the rank indicator (RI) reporting is an integer multiple MRI [1, . . . , 32] of period NPD [1, . . . 160] in sub-frames for a TDD system. The periodic reports may be transferred using the Physical Uplink Control Channel (PUCCH) and aperiodic reports using the Physical Uplink Shared Channel (PUSCH).

In current LTE specifications, a Rank Indicator report includes a field containing a number of bits, the set value of which indicates the user device's preferred RI. For example, a field including 3 bits could be used to indicate any selected one of up to 8 transmission rank values. In a preferred embodiment of the present invention, the Rank Indicator report includes a field including a first number of bits the value of which is used to indicate the user device's preferred transmission rank for the downlink and an additional bit the selected value of which is used to indicate whether the user device 3, 4 prefers full duplex mode or non hill duplex mode.

In this example, the preferred RI and operation mode are reported at the same time and hence at the same rate. This is advantageous because it keeps reporting overheads to a minimum and is acceptable because changing channel conditions will likely dictate that transmission rank and operation mode should be changed at similar rates.

In this example a user device 3, 4 reports an RI, an indication of whether full duplex or non full duplex operation is preferred and CQI index value or values. A user device 3, 4 does not report back to the base station 2 any Pre-coder Matrix Indication (PMI) indicating a suggested set of 'pre-coding weights' from a pre-defined code book of 'pre-coding weights' to be applied at the base station 2 for the downlink transmission and nor does the base station need to indicate to a user device 3, 4 which set of 'pre-coding weights' from the pre-defined code book of 'is to be applied at the base station 2 for the downlink transmission. Instead, this example, relies on so called 'non codebook-based pre-coding', as is used in transmission mode 9 defined in LTE release 10. In such non codebook-based pre-coding, the layers to be transmitted by the base station 2 to a user device 3, 4 include demodulation reference signals (DM-RS) that are introduced into the layers prior to the pre-coding. The transmission of these pre-coded reference signals allows for demodulation and recovery of the transmitted layers at the user device without the user device having explicit receiver knowledge of the pre-coding applied at the base station 2.

It will be appreciated however that embodiments of the invention are not limited to arrangements where the downlink transmission utilises non codebook-based pre-coding. Embodiments of the invention may also include arrangements where the downlink transmission utilises so called 'codebook-based pre-coding' like transmission mode 3 defined in LTE release 10 which supports open loop spatial multiplexing, or transmission mode 4 defined in LTE release 10 which supports closed loop spatial multiplexing. It will be appreciated that if an embodiment of the invention uses closed loop spatial multiplexing, then a user device 3, 4 will need to feedback Precoding Matrix Indicator (PMI) reports to the base station 2, in addition to the RI reports, the full duplex operation or non full duplex operation reports and the CQI reports. As is well known, a PMI indicates a suggested set of 'pre-coding' weights that the base station may apply. Open loop and closed loop spatial multiplexing are well known techniques and so will not be discussed in any further detail.

Referring again to FIG. 1, the base station 2 also periodically evaluates whether it can receive full duplex transmission using a similar process to that described above for the user devices 3, 4, that is to say, the base station 2 evaluates the cancellation gain of suppressing downlink transmission from uplink reception and based on this measurement determines if it is likely that full duplex reception can be made. If it is determined that full duplex reception can be made, fill duplex mode may be scheduled for those user devices 3, 4 that have indicated that this is their preferred operating mode. In response to receiving the RI and CQI reports from the user devices 3, 4, the base station 2 determines for each user device 3, 4 whether or not to apply for that user device the preferred transmission rank and whether or not to apply full duplex operation for those user devices 3, 4 that have indicated this to be their preferred operating mode. Half duplex operation will automatically be applied for those user devices 3, 4 that have indicated this as their preferred operating mode. In general, base station 2 will allocate the rank to a user device 3, 4 that matches the one indicated as being preferred by that user device and typically only in cases where there is a small amount of data in the base station's transmission buffer for a user device, will a lower rank be allocated by the base station 2.

station 2. In some circumstances, in particular, for rank 1 downlink channels, use of the full duplex operation mode instead of half duplex operation in combination with conventional downlink MIMO rank 1 modes (e.g. transmit diversity or beam forming) provides an increase in throughput. In a preferred example, applicable to the Physical Downlink Shared Channel (PDSCH) and the Physical Uplink Shared Channel (PUSCH) of an LTE system, use of the full duplex mode for communications between the base station 2 and a user device 3, 4 doubles the throughput of the downlink and uplink shared channels in the event of a rank 1 channel.

In current LTE TDD systems, seven different frame configuration formats have been set, each of which defines which sub frames in a frame are allocated for uplink transmissions and which sub frames in a frame are allocated for downlink transmissions. These conventional frame formats are listed as formats 0 through to 6 in table 7 below.

TABLE 7

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | — | DU | DU | DU | DU | DU | DU | DU | DU | DU | DU |

The base station 2 may schedule downlink and uplink resources among the user devices 3, 4 using known algorithms such as the round robin algorithm (which allocates the same amount of resources to each user device) or the proportional fair algorithm (which allocates resources to user devices dependent upon achievable data rates at each time instance) or any other type of scheduling algorithm.

In the example of FIG. 1, the user device 3 is on the edge of the cell served by the base station 2 and the path loss between it and the base station 2 is so large that it cannot use full-duplex mode efficiently. Hence a feedback RI and CQI report provided by the user device 3 to the base station 2 indicates that full-duplex is not the preferred mode of operation for the user device 3. The user device 4 is closer to the base station 2 and, as discussed above, based on an SINR measurement the user device 4 determines that its preferred operational mode is full duplex so its RI and CQI report provided to the base station 2 indicates that full-duplex is the preferred mode of operation. The base station 2 determines for each user device 3, 4 a decision of what mode to support. If the base station 2 determines that user device 3 will not be interfered by full-duplex operation of the user device 4, it can permit user device 4 to use full-duplex operation. The base station 2 may determine whether there is sufficient isolation between the user devices 3, 4 for the user device 4 to be permitted to use full duplex operation based on known techniques. For example, based on the direction and time of arrivals of the user signals at the base station, by using Global Positioning System (GPS) coordinates reported by the user devices or by using path loss measurements made by user devices of the uplink transmissions from other user devices reported to the base In table 7, 'D' indicates that a sub frame is allocated for downlink transmissions, 'U' indicates that a sub frame is allocated for uplink transmissions and 'S' indicates a so called special sub frame in which a switch between downlink transmission to uplink transmissions occurs. Downlink to uplink switch point periodicity may be 5 ms (for those configurations where sub frames 1 and 6 are special frames) or 10 ms (for those configurations where just sub frame 1 is a special frame). In current LTE systems, the Uplink-Downlink configuration is set on a cell by cell basis (i.e. all user devices in a cell are set the same configuration) and the configuration can be changed dynamically, to take account of varying load conditions on the uplink and on the downlink. The frame configuration is located in the TDD-Config IE which is broadcasted in SystemInformationBlockType1 which can be decoded by a user device from the Physical Downlink Shared Channel once every second 10 ms radio frame.

In a preferred example of the FIG. 1 network being based on an LTE TTD network, a new frame configuration format, listed as format 7 in table 7, is defined for full duplex operation. In the new frame configuration format each sub frame is for downlink transmission and for uplink transmission. The base station 2 signals the new frame configuration format to the user device 4 using user specific signalling, for example, an RRCConnectionReconfiguration message (or an RRDConnectionSetup Message) may be appended to include the full duplex frame configuration and transmitted from the base station 2 to the user device 4.

It will be appreciated that, in this example, at least two frame configuration formats are required, one like format 7 in table 7 for user devices that the base station 2 is going to schedule for full duplex operation, and one like any of the half duplex formats in table 7 for user devices that are (a) full duplex compatible but for which the base station 2 is going to schedule half duplex operation and (b) legacy user devices that are not full duplex compatible. In a preferred embodiment, the available frame configuration formats are those shown in table 7 and the applicable half duplex format for a cell (i.e. that to be used by the user devices served by the base station 2 that are not scheduled for full duplex operation) broadcast in a conventional manner (i.e. using a TDD-Config IE message as discussed above).

The base station 2 schedules for each TTI, which user devices to transmit data to and which user devices to receive data from, and on which set or resource blocks. The resulting scheduling decisions are transmitted from the base station 2 to the user devices on the Physical Downlink Control Channel (PDCCHI). User devices that are currently configured in accordance with the full duplex frame configuration format, can be scheduled to transmit on the uplink and receive on the downlink in the same sub frame, transmit on the uplink in a sub frame but not receive on the downlink in that sub frame, or receive on the downlink in a sub frame but not transmit on the uplink in that sub frame. User devices that are configured in accordance with a non full duplex frame configuration format can be scheduled to transmit on the uplink only on sub frames allocated to the uplink and receive on the downlink only in sub frames that are allocated for the downlink.

In the example being described with respect to FIG. 1, as the user device 3 is on the cell edge and cannot efficiently use full-duplex transmission, it is likely that the base station 2 has the same problem (i.e. the path loss is too high for efficient interference processing in the base station receiver). Accordingly, the base station 2 uses scheduling to adaptively allocate full duplex mode for user devices in a cell that can perform the full duplex reception and allocate half duplex mode for user devices in a cell that cannot perform the full duplex reception.

Figure 5:
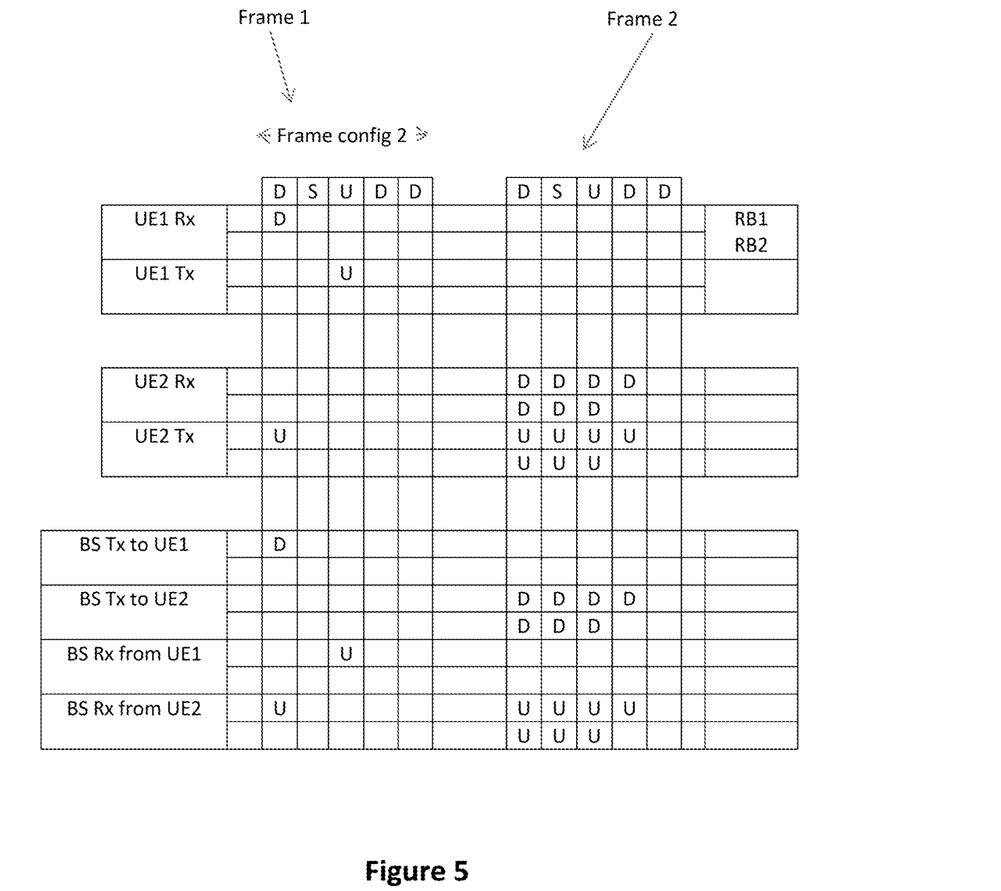
FIG. 5 illustrates downlink and uplink sub frame scheduling for first and second user devices.

FIG. 5 schematically illustrates scheduling between user device 3 (UE1 in FIG. 5) and user device 4 (UE2 in FIG. 5), when, UE1 cannot support the full duplex mode but UE2 can and UE1 and UE2 are sufficiently far apart from each other so that their transmissions don't mutually interfere with each other. FIG. 5 is based on the assumption that the TDD frame configuration allocated to half duplex user devices is configuration 2 from Table 7. Sub frames in which either UE1 or UE2 receive (Rx) on the downlink from the base station (BS) (or conversely the base station (BS) transmits (Tx) on the downlink to either UE1 or UE2) are labelled (D). Sub frames in which either UE1 or UE2 transmit (Tx) on the uplink to the base station (BS) (or conversely the base station (BS) receives (Rx) on the uplink from either UE1 or UE2) are labelled (U). For the sake of simplicity, in the time domain, the first 5 ms half of two frames are illustrated and in the frequency domain two resource blocks (RB1, RB2) are illustrated (although for the sake of further simplicity each RB is show as being in a 1 ms sub-frame, rather than a 0.5 ms slot because in current LTE systems scheduling is made at the sub frame granularity (i.e. two 0.5 ms RBs are always concatenated together in the time domain).

In the example of FIG. 5, the half duplex UE1 receives a downlink transmission on downlink RB1 in the first sub-frame of frame 1 and the full duplex UE 2 transmits an uplink transmission on uplink RB1. This is possible because (a) UE1 and UE2 are sufficiently separated so that the uplink transmission of the full duplex UE2 is suppressed by path loss at the receiver of UE1 and so does not interfere with the downlink reception at UE1 and (b) the base station is capable of full duplex operation to receive the uplink transmission of UE2 (i.e. processing at the base station ensures that downlink transmission to UE1 does not interfere with the uplink reception from UE2). In the third sub frame of frame 1 the half duplex UE1 is scheduled an uplink transmission on uplink RB1, but as UE1 is located at the cell edge so that the base station is not capable of full duplex operation when communicating with UE2. UE1 is not scheduled to receive on the downlink because that downlink transmission would interfere with the uplink reception at the base station. This example in frame 1 illustrates that it may be possible to use full duplex processing in the base station to receive from a full duplex UE while transmitting to a half duplex UE.

In frame 2, full duplex mode transmission and reception is scheduled for UE2 and no transmission or reception is scheduled for UE1. In each of the first three sub frames of frame 2, UE2 receives downlink transmissions on downlink RB31 and RB2 and transmits uplink transmissions on uplink RB1 and RB2. In the fourth sub frame of frame 1, UE2 receives downlink transmissions on downlink RB1 and transmits uplink transmissions on uplink RB1.

In this example, for simplicity, the frequencies of the sub-carriers of uplink RB1 and the frequencies of the sub-carriers of downlink RB1 are the same and likewise for uplink RB2 and downlink RB2. However, it should be appreciated that this need not be the case, so that, when operating in full duplex mode within an LTE channel bandwidth, for example a 10 MHz bandwidth, a UE may simultaneously, transmit using a set of one or more uplink RBs each of which has the same sub carrier frequencies as an RB in a set of one or more downlink RBs being received, or it may, simultaneously transmit on a set of one or more uplink RBs each of which has different sub carrier frequencies to each of those of a set of one or more downlink RBs that are being received or, there may be a partial correspondence in terms of the sub-carrier frequencies of the uplink RBs being transmitted and the downlink RBs being received.

Although in the described embodiment the base station 2 utilises signalling to configure and schedule either full duplex or half duplex transmissions between itself and a user device 3, 4, it will be appreciated that in alternative embodiments the base station 2 may utilise such signalling to configure and schedule either full duplex or half duplex transmissions between a pair of device to device (D2D) node pairs, for example, the user device 3, 4.

Figure 6:
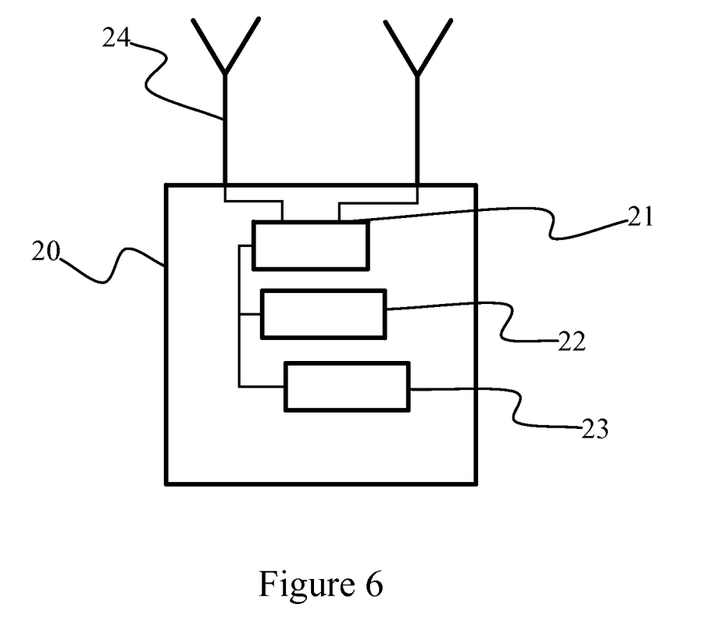
FIG. 6 is a schematic illustration of a wireless user equipment.

FIG. 6 shows schematically a user equipment or wireless device, 20 in this case in the form of a mobile phone/smartphone, suitable for use as user device 3 or 4 in FIG. 1. The user equipment 20 contains the necessary radio module 21, processor(s) 22 and memory/memories 23, multiple antennas 24, etc. to enable wireless communication with the network as described above.

Figure 7:
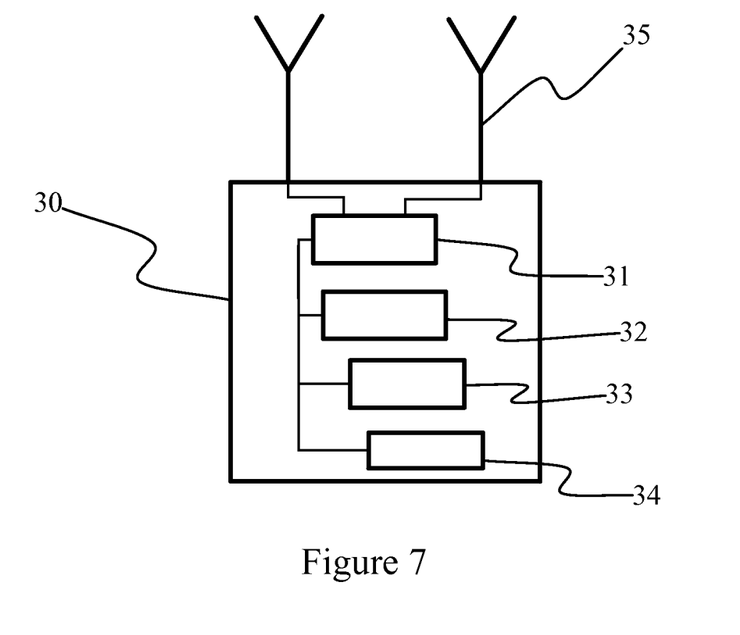
FIG. 7 is a schematic illustration of a network entity.

FIG. 7 shows schematically a network entity 30 suitable for use as the base station 2 in FIG. 1. The term "base station" is used in this specification to include a "traditional" base station, a Node B, an evolved Node B (eNB), or any other access point to a network, unless the context requires otherwise. The network entity 30 includes its own radio module 31, processor(s) 32 and memory/memories 33, schedulers 34, and multiple antennas 35 etc to enable wireless communication with the user devices 3, 4 as described herein above.

Although at least some aspects of the embodiments described herein with reference to the drawings include computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may include a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may include circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The above embodiments are to be understood as illustrative examples of the invention. Further embodiments of the invention are envisaged. For example, although the preferred example is described in the context of an LTE TDD system this is not essential. In another example, a LTE Frequency Division Duplex (FDD) system can be modified such that instead of having dedicated uplink and downlink carrier frequencies, the full duplex transmission can occupy both uplink and downlink carrier frequencies simultaneously for both uplink and downlink transmission by a single network device in some of the sub-frames.

In yet another example, the frequencies reserved for uplink and downlink in LTE Frequency Division Duplex (FDD) system can be reallocated for 2 TDD systems, one operating on the uplink frequency and one on the downlink frequency.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A network apparatus in a wireless communication system, the network apparatus comprising:
    at least one processor; and at least one memory including computer program code, the at least one memory and the computer program code being configured to, with the at least one processor, cause the network apparatus to:
    determine to send, to at least one first user equipment served by a base station, a message indicating that the at least one first user equipment is to operate in a half duplex mode, in which mode some time periods are reserved for the at least one first user equipment to transmit in a frequency band without receiving in the frequency band and other time periods are reserved for the at least one first user equipment to receive in the frequency band without transmitting in the frequency band;
    determine to send, to at least one second user equipment, served concurrently by the base station with the at least one first user equipment, a message indicating that the at least one second user equipment is to operate in a full duplex mode in which mode the at least one second user equipment simultaneously transmits and receives in the frequency band; and
    schedule transmissions to and from the at least one first user equipment and to and from the at least one second user equipment,
    wherein the at least one memory and the computer program code, are configured, with the at least one processor, to cause the network apparatus to:
        (a) schedule the at least one first user equipment to receive a transmission to be transmitted by a transceiver operating in the full duplex mode in the frequency band in a first time period of a radio frame;
        (b) schedule the at least one second user equipment to transmit a transmission to the transceiver in the first time period in the frequency band;
        determine a transmission rank estimated to, in combination with the full duplex mode, provide a highest throughput of data between the at least one second user equipment and the base station; and
        transmit, to the at least one second user equipment, an identification of the full duplex mode and the determined transmission rank,
    wherein the identification of the full duplex mode and the determined transmission rank comprises a first field comprising a first number of one or more bits that indicate the determined transmission rank and a second number of one or more bits that indicate the full duplex mode.

2. The network apparatus according to claim 1, wherein the at least one memory and the computer program code, are configured, with the at least one processor, to cause the network apparatus to:
(c) schedule the at least one first user equipment operating in the half duplex mode to transmit a transmission to the transceiver in the frequency band in a second time period of the radio frame without scheduling the at least one second user equipment operating in the full duplex mode to receive a transmission in the second time period in the frequency band from the transceiver.

3. The network apparatus according to claim 1, wherein the at least one memory and the computer program code, are configured, with the at least one processor, to cause the network apparatus to:
estimate prior to (a) and (b) that interference at the at least one first user equipment that would be caused by the at least one second user equipment transmitting the transmission to the transceiver in the first time period in the frequency band will be low enough for the at least one first user equipment to receive the transmission from the transceiver in the first time period.

4. The network apparatus according to claim 3, wherein the estimation is at least partly based upon an estimate of positions of the at least one first user equipment and the at least one second user equipment.

5. The network apparatus according to claim 1, wherein the at least one memory and the computer program code, are configured, with the at least one processor, to cause the network apparatus to, prior to (a) and (b), to receive at the network apparatus a report from the at least one first user equipment indicating that its preferred operating mode is the half duplex mode and a report from the at least one second user equipment indicating that its preferred operating mode is the full duplex mode.

6. The network apparatus according to claim 1, wherein the at least one memory and the computer program code, are configured, with the at least one processor, to cause the network apparatus to:
determine another transmission rank estimated to, in combination with the half duplex mode, provide a highest throughput of data between the at least one first user equipment and the base station; and
transmit, to the at least one first user equipment, an identification of the half duplex mode and the other transmission rank.

7. The network apparatus according to claim 1, wherein the determination of the transmission rank is based on an amount of buffered data at the at least one second user equipment awaiting transmission.

8. A method, comprising:
determining to send, by an apparatus to at least one first user equipment served by a base station, a message indicating that the at least one first user equipment is to operate in a half duplex mode, in which mode some time periods are reserved for the at least one first user equipment to transmit in a frequency band without receiving in the frequency band and other time periods are reserved for the at least one first user equipment to receive in the frequency band without transmitting in the frequency band;
determining to send, by the apparatus to at least one second user equipment, served concurrently by the base station with the at least one first user equipment, a message indicating that the at least one second user equipment is to operate in a full duplex mode in which mode the at least one second user equipment simultaneously transmits and receives in the frequency band;
scheduling transmissions by the apparatus, to and from the at least one first user equipment and to and from the at least one second user equipment, wherein scheduling includes:
(a) scheduling the at least one first user equipment to receive a transmission to be transmitted by a transceiver operating in the full duplex mode in the frequency band in a first time period of a radio frame, and
(b) scheduling the at least one second user equipment to transmit a transmission to the transceiver in the first time period in the frequency band;
determining a transmission rank estimated to, in combination with the full duplex mode, provide a highest throughput of data between the at least one second user equipment and the base station; and
transmitting, to the at least one second user equipment, an identification of the full duplex mode and the determined transmission rank,
wherein the identification of the full duplex mode and the determined transmission rank comprises a first field comprising a first number of one or more bits that indicate the determined transmission rank and a second number of one or more bits that indicate the full duplex mode.

9. The method of claim 8, further comprising:
(c) scheduling the at least one first user equipment operating in the half duplex mode to transmit a transmission to the transceiver in the frequency band in a second time period of the radio frame without scheduling the at least one second user equipment operating in the full duplex mode to receive a transmission in the second time period in the frequency band from the transceiver.

10. The method of claim 9, further comprising:
estimating prior to (a) and (b) that interference at the at least one first user equipment that would be caused by the at least one second user equipment transmitting the transmission to the transceiver in the first time period in the frequency band will be low enough for the at least one first user equipment to receive the transmission from the transceiver in the first time period.

11. The method of claim 10, wherein the estimation is at least partly based upon an estimate of positions of the at least one first user equipment and the at least one second user equipment.

12. The method of claim 8, further comprising:
prior to (a) and (b), receiving, at the apparatus, a report from the at least one first user equipment indicating that its preferred operating mode is the half duplex mode and a report from the at least one second user equipment indicating that its preferred operating mode is the full duplex mode.

13. The method of claim 8, further comprising:
determining another transmission rank estimated to, in combination with the half duplex mode, provide a highest throughput of data between the at least one first user equipment and the base station; and
transmitting, to the at least one first user equipment, an identification of the half duplex mode and the other transmission rank.

14. The method of claim 8, wherein the determination of the transmission rank is based on an amount of buffered data at the at least one second user equipment awaiting transmission.

* * * * *